June 6, 1972  YOSHITOMO EGUCHI  3,667,910
PROCESS FOR REMOVING SULFUR OXIDES FROM WASTE GAS
Filed Aug. 27, 1969
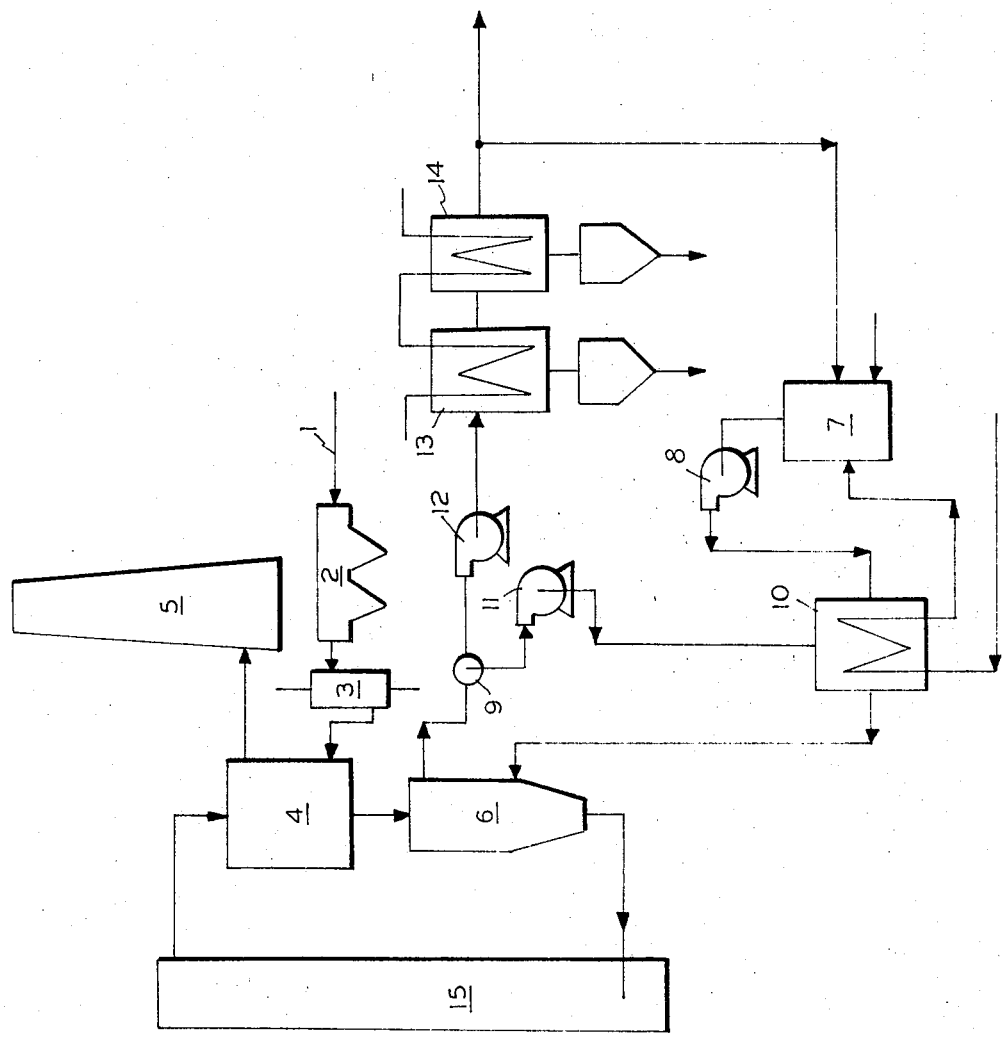
INVENTOR
YOSHITOMO EGUCHI
BY *Wenderoth, Lind & Ponack*
ATTORNEYS

United States Patent Office 3,667,910
Patented June 6, 1972

3,667,910
PROCESS FOR REMOVING SULFUR OXIDES FROM WASTE GAS
Yoshitomo Eguchi, Takarazuka, Japan, assignor to Takeda Chemical Industries, Ltd., Osaka, Japan
Filed Aug. 27, 1969, Ser. No. 853,440
Claims priority, application Japan, Aug. 27, 1968, 43/61,322; May 13, 1969, 44/36,774
Int. Cl. C01b *17/56, 17/60*
U.S. Cl. 23—178　　　　　　　　　　　　　　　　4 Claims

ABSTRACT OF THE DISCLOSURE

In the process for removing sulfur oxides from waste gases with employment of activated carbon as the adsorbent, the chemical exhaustion of activated carbon and the lowering of its ability for adsorbing sulfur oxides in the regeneration step can be remarkably prevented by regenerating the sulfur oxides-adsorbing activated carbon with the desorbent containing carbon monoxide gas and/or hydrogen gas in a concentration at least about 40% at a temperature from about 230° C. to about 450° C. The most advantageous results can be attained by employing vanadium oxide-supporting activated carbon as the adsorbent.

---

This invention relates to a process for removing sulfur oxides from waste gas.

Various waste gases from oil or coal furnaces, from roasting or sintering plants or from sulfonation plants and the like contain a significant amount of sulfur oxide compounds e.g. sulfur dioxide and sulfur trioxide, and such sulfur oxides have been known as exerting biologically harmful effects. Therefore, it is a serious social problem how to prevent a public nuisance due to the sulfur oxides contained in waste gases.

For the purpose of removing sulfur oxides from waste gases, there have hitherto been proposed many processes with the employment of various kinds of adsorbents, absorbents or catalysts.

Among these hitherto known processes for removing sulfur oxides from waste gases, those employing activated carbon as the adsorbent may be considered more industrially feasible than others, because activated carbon is of relatively low cost per se and it exhibits not only adsorbing action but also catalytically oxidizing action against sulfur oxides. However, these processes employing activated carbon are still accompanied by such drawbacks that activated carbon is chemically exhausted and its adsorbing ability for sulfur oxides is remarkably lowered by repeated use. More specifically, it is necessary from industrial viewpoints to repeatedly employ activated carbon by regenerating activated carbon on which sulfur oxides are adsorbed, because a relatively large amount of the adsorbent is necessarily employed owing to the enormous volume of waste gases to be treated. In these hitherto known processes the regeneration of the activated carbon, i.e. desorption of sulfur oxides from the activated carbon, is carried out by contacting the sulfur oxides-adsorbing activated carbon with a specified inert gas such as nitrogen, or a combustion gas containing nitrogen and from which oxygen and sulfur dioxide are removed; a superheated steam atmosphere at an elevated temperature not higher than about 450° C. or merely employing elevated temperatures as high as 600° C. without superheated steam. In this regeneration operation the activated carbon is chemically exhausted in a significant proportion and results in a considerably reduced adsorbing ability for sulfur oxides.

The present inventor has unexpectedly found that when the sulfur oxide-adsorbing activated carbon is contacted with a specified gas, i.e. a gas containing a high concentration of carbon monoxide gas, hydrogen gas or a mixture thereof at an elevated temperature, the sulfur oxides are completely desorbed from the activated carbon and according to the said regeneration operation the exhaustion of the activated carbon and lowering of its adsorbing ability can be remarkably prevented. The present inventor has also found that when the adsorption of sulfur oxides contained in waste gases is carried out with employment of a specified activated carbon, i.e. activated carbon on which vanadium oxide is supported (hereinafter referred to as "vanadium oxide-supporting activated carbon"), followed by the regeneration operation employing the above-mentioned desorbent, the reduction of adsorption capacity for the sulfur oxides can be substantially prevented.

The present invention was accomplished on the basis of said findings, and, its principal object is to provide a novel and industrially feasible process for removing sulfur oxides from waste gases in which activated carbon can be employed in almost inexhaustible repetition through the cycles of the adsorption of sulfur oxides and the regeneration of activated carbon. Another object of the present invention is to provide a novel desorbent for the sulfur oxides adsorbed on the activated carbon in the process for removing sulfur oxides from waste gases.

In the process of the present invention the adsorption is carried out by contacting waste gases containing sulfur oxides with activated carbon at a temperature lower than about 200° C. As the activated carbon, there may be employed any type of conventional activated carbon having hitherto been employed for the adsorption of sulfur oxides. In other words, there may be employed various types of activated carbon which are prepared from various materials such as coals, woods, nut-shells and the like. These activated carbons may be employed in granular form or powdery form. Among these activated carbons, it is advantageous to employ those having the surface area of between about 300 m.$^2$/g. and 2000 m.$^2$/g., especially of between about 600 m.$^2$/g. to about 1200 m.$^2$/g.

As mentioned above, vanadium oxide-supporting activated carbon as the activated carbon is considerably more resistant to a lowering of adsorption capacity than ordinary activated carbon.

The vanadium oxide-supporting activated carbon may be prepared easily by allowing vanadium oxide to be supported on such conventional activated carbon as mentioned above. Though the vanadium oxide may be in any form of vanadium oxides, it is preferable that the ratio of divanadium pentoxide be high. Practically, this vanadium oxide-supporting activated carbon is prepared, for example, by immersing activated carbon into an aqueous solution of a vanadium compound such as ammonium vanadate or vanadium sulfate, stirring the mixture for from about 2 to 3 hours, subjecting the mixture to evaporation to dryness and subsequently subjecting the resultant carbon to heating at a temperature between about 250° C. and about 700° C.

Generally, it is most advantageous to employ the vanadium oxide-supporting activated carbon in which the vanadium oxide is supported on activated carbon at a ratio of from about 0.001 to about 0.1 part by weight, especially from about 0.002 to about 0.03 part by weight in terms of divanadium pentoxide, per part by weight of activated carbon.

The vanadium oxide-supporting activated carbon is characterized by its very strong adsorption and catalytic oxidation capacity for sulfur oxides especially on repeated use.

The contact of waste gases with the activated carbon, i.e. conventional activated carbon or the vanadium oxide-supporting activated carbon, is carried out at temperatures lower than about 200° C. More particularly in case of employing conventional activated carbon, the contact is is carried out at a temperature between the dew point of waste gases (generally from about 60° to about 80° C.) and about 180° C. Meanwhile, the vanadium oxide-supporting activated carbon may be preferably contacted with waste gases at a temperature between the dew point of the waste gases and about 180° C., but it is possible to contact it with waste gases at a temperature between about 180° C. and about 200° C. or between room temperature and the dew point of the waste gas, due to its strong ability of adsorbing and of catalytically oxidizing sulfur oxides.

The optimal space velocity (volume of treated waste gas per volume of the activated carbon per hour) in the adsorption step varies with such factors as the kinds of waste gases, the temperature, the type of activated carbon and the like. However, it is generally preferable to contact the waste gas with activated carbon at a space velocity lower than about 5000 hr.$^{-1}$. The most practical space velocity to allow sulfur oxides in waste gases to be adsorbed substantially completely on the activated carbon is less than about 3000 hr.$^{-1}$ for the vanadium oxide-supporting activated carbon and less than about 1500 hr.$^{-1}$ for the conventional activated carbon.

The contact of waste gases with the activated carbon may be conducted in any system of fixed beds, moving beds or fluidized beds. In case of a moving bed, waste gases may flow in a countercurrent, a parallel current or cross current relative to the activated carbon.

By the above-mentioned contacting operation of waste gases with the activated carbon, substantially the entire amount of sulfur oxides contained in waste gases is adsorbed on the activated carbon in their oxidized forms such as sulfur trioxide or sulfuric acid.

According to the process of the present invention sulfur oxides thus-adsorbed on the activated carbon are desorbed as sulfur dioxide by contacting the sulfur oxides-adsorbing activated carbon with a specific desorbent, i.e. a gas containing carbon monoxide gas, hydrogen gas or a mixture thereof at an elevated temperature.

The desorbent to be employed in this desorption step includes a gas substantially consisting of carbon monoxide, a gas substantially consisting of hydrogen, a gas substantially consisting of carbon monoxide and hydrogen, and a gas mixture containing the above-mentioned gas together with the inert gas conventionally employed such as nitrogen gas, carbon dioxide gas. The desorbent should contain carbon monoxide gas and/or hydrogen gas in a concentration at least about 40% relative to the whole volume of the desorbent; otherwise the exhaustion of the activated carbon and lowering of adsorbing ability of the activated carbon for sulfur oxides cannot be sufficiently prevented. Generally, it is advantageous to employ a desorbent containing carbon monoxide or/and hydrogen in a concentration higher than about 50% relative to the whole volume. In comparison with hydrogen, carbon monoxide is more desirable from the viewpoint of the said effects.

In practice, carbon monoxide gas and hydrogen gas may be easily separated from producer gases, water gases, semi water gases, or various complete gases prepared by complete gasification of pulverized coals, naphthas, natural gases and the like, while these gas preparations may be preferably employed themselves as far as they contain carbon monoxide or/and hydrogen in a concentration at least about 40% relative to their whole volumes and contain substantially no oxygen gas. Also carbon monoxide prepared by contacting carbon dioxide with ignited carbon may be conveniently employed.

The contact of the sulfur oxides-adsorbing activated carbon with the above-mentioned desorbent is conducted at an elevated temperature between about 230° C. and 450° C., advantageously between about 250° C. and 350° C. At a temperature lower than about 230° C. sulfur oxides adsorbed on the activated carbon cannot be completely desorbed, while the activated carbon burns at a temperature higher than about 450° C.

The said contact operation may be effectively conducted under normal pressure, while it is more advantageous to employ the desorbent under a high pressure between about 3 kg./cm.$^2$ and about 10 kg./cm$^2$.

The optimal flow velocity of the said desorbent varies with many factors such as the amount of sulfur oxides adsorbed on the activated carbon, the pressure, the concentration of carbon monoxide or/and hydrogen in the desorbent, and so on. Generally, it is advantageous to allow the desorbent to flow at a flow velocity between about 0.01 cm./second and about 10 cm./second as superficial flow velocity.

This desorption operation may be carried out in any system of fixed beds, moving beds or fluidized beds correspondingly to the contact system in the adsorption step.

By the said contact of the sulfur oxides-adsorbing activated carbon with the desorbent, sulfur oxides are desorbed as sulfur dioxide in a greatly increased concentration in relation to their concentration in the original waste gases.

According to the present process thus-regenerated activated carbon may be reused in the next adsorption operation for sulfur oxides in waste gases and the activated carbon can be employed in almost inexhaustible repetition through the cycle of the above-mentioned adsorption and regeneration.

The desorbed sulfur dioxide is recovered from the resulting gas mixture of the desorbent and sulfur dioxide. The recovery of sulfur dioxide may be carried out in a desired manner per se known to recover as sulfur dioxide itself or a sulfur dioxide-originating product such as sulfuric acid. For example, the sulfur dioxide is recovered as liquid sulfur dioxide by cooling the gas mixture consisting of the desorbent and sulfur dioxide to a temperature below about −10° C. The desorbent separated from sulfur dioxide may be reused in the desorption step. Furthermore, it may be preferable to employ repeatedly the gas mixture per se as the desorber in the desorption operation to further elevate the concentration of sulfur dioxide in the gas mixture and subsequently to recover sulfur dioxide from the resulting gas mixture.

An exemplified flow sheet of the present process is shown in the figure. Waste gases containing sulfur oxides (I) are conducted into the dust collection room 2 wherein dusts such as fly ash and rubble in the waste gases are removed. The dust-free waste gases are cooled by the cooler 3 to a temperature lower than about 200° C., preferably between the dew point of the waste gases to be treated and about 180° C. and then are conducted into the adsorbent tower 4 charged with activated carbon, advantageously with the vanadium oxide-supporting activated carbon, wherein substantially all the sulfur oxides in the waste gases are adsorbed on the activated carbon. The sulfur oxides-free waste gases are exhausted via the smokestack 5 into the atmosphere. The activated carbon is moved counter to the flow of waste gases in the adsorbent tower 4 and the sulfur oxides-adsorbing activated carbon is transferred from the bottom of the adsorbent tower 4 to the regenerating tower 6.

Carbon monoxide gas or/and hydrogen gas produced in the generator 7 is combined with the circulating desorbent 9. The resulting mixture is heated by the heating apparatus 10 e.g. heat exchanger to a temperature between about 230° C. and 450° C., preferably between about 250° C. and 350° C., and then conducted into regenerating tower 6 at a flow velocity of about 0.01 cm./second and about 10 cm./second as superficial flow velocity, whereby the sulfur oxides adsorbed on the activated carbon are desorbed as sulfur dioxide into the gas passing through the regenerating tower 6 and the activated carbon is regenerated.

The bulk of the gas passing through the regenerating tower 6 is allowed to circulate through the blower 11 and heating apparatus 10 to the regenerating tower 6 for reuse. The rest of said gas is conducted through the blower 12 into the condenser 13 wherein the gas is cooled to about 4° C. to separate a diluted sulfuric acid solution, and subsequently into another condenser 14 wherein the gas is cooled to a temperature lower than about −10° C. to recover liquid sulfur dioxide. Thus treated gas still contains carbon monoxide or/and hydrogen, and may be allowed to circulate through the regenerator 7 or directly to the heating apparatus 10 for re-employment as the desorbent in the regenerating tower 6, or may be employed for another use such as fuel gas.

The regenerated activated carbon is transferred continuously or at intervals, from the regenerating tower 6 to the adsorbent tower 4 for reuse through the transferring system 15.

The process of the present invention may be advantageously applied to any kind of waste gases containing sulfur oxides, such as flue gases from thermal-power stations, waste gases from chemical factories, waste gases from smelting furnaces, and the like.

According to the process of present invention the undesirable exhaustion of the activated carbon and lowering of its adsorbing ability in the regeneration of the activated carbon can be substantially prevented with the result that the activated carbon can be employed in almost inexhaustible repetition through the circle of the adsorption of sulfur oxides in waste gases and the regeneration of the activated carbon.

Tests

Adsorbent A.—Activated carbon which has adsorbing ability of 25% w./w. for sulfur dioxide, and which has break through points of 11.5 hours for break through ratio of 0.1, and 21 hours for the break through ratio of 0.5, respectively, against a flue gas containing 0.2% v./v. of sulfur dioxide at a flow velocity of 0.45 m./second as superficial flow velocity at 110° C. in an adsorbent tower of 1 m. height.

Adsorbent B.—Vanadium oxide-supporting activated carbon in which vanadium oxide (substantially consisting of divanadium pentoxide) is supported on the above-mentioned activated carbon in a ratio of about 0.01 part by weight per part by weight of the activated carbon.

Each of adsorbent towers of 1 m. height was charged with Adsorbent A or Adsorbent B. Into the respective adsorbent towers a flue gas containing 0.2% v./v. of sulfur dioxide, 3% v./v. of oxygen and 10% v./v. of moisture was allowed to flow at a velocity of about 0.4 m./second as superficial flow velocity at about 110° C. for 15 hours.

The resulting sulfur oxide-adsorbing adsorbents were regenerated by allowing nitrogen gas as control desorbent, or the desorbents of the present process listed in table to flow into the respective towers at a flow velocity of about 2 cm./second as superficial flow velocity at about 300° C. under pressure of 1 kg./cm.$^2$ or 4 kg./cm.$^2$ for 3 hours.

Thus-regenerated adsorbents were again contacted with said flue gas under the same conditions as above, respectively.

The cycles of above-mentioned desorption of sulfur dioxide and regeneration of the adsorbents were conducted ten times in connection with the respective desorbents.

The exhaustion ratio of the adsorbents and the lowering ratio in their adsorbing ability for sulfur dioxide relative to the respective original adsorbents were determined.

The results are summarized in table.

TABLE

| Test No. | Adsorbent | Composition of desorbent | Percent, v./v. | Pressure of regeneration step, kg./cm.$^2$ | Lowering ratio in SO$_2$—adsorbing ability of adsorbent, percent | Exhaustion ratio of adsorbent percen, |
|---|---|---|---|---|---|---|
| Control Test A | A | N$_2$ | 100 | 1 | 12.0 | 9.0 |
| 1 | A | CO / N$_2$ | 97.5 / 2.5 | 1 | 4.0 | 3.1 |
| 2 | A | CO / N$_2$ | 97.5 / 2.5 | 4 | 2.8 | 2.1 |
| 3 | A | H$_2$ / N$_2$ | 99 / 1 | 1 | 5.8 | 3.4 |
| 4 | A | CO / H$_2$ / N$_2$ / CO$_2$ | 65.0 / 21.0 / 0.9 / 13.1 | 1 | 5.6 | 3.8 |
| 5 | A | CO / H$_2$ / N$_2$ / CO$_2$ | 65.0 / 21.0 / 0.9 / 13.1 | 4 | 3.4 | 3.0 |
| Control Test B | B | N$_2$ | 100 | 1 | 0.9 | 10.1 |
| 6 | B | CO / N$_2$ | 97.5 / 2.5 | 1 | 0.8 | 4.0 |
| 7 | B | CO / H$_2$ / N$_2$ / CO$_2$ | 65.0 / 21.0 / 0.9 / 13.1 | 1 | 0.8 | 4.6 |

What is claimed is:

1. A process for removing sulfur oxides from waste gas which comprises contacting waste gas containing sulfur oxides with a vanadium oxide-supported activated carbon, wherein vanadium oxide is supported on activated carbon in a ratio of from about 0.001 to about 0.1 part by weight in terms of divanadium pentoxide per part by weight of activated carbon, at a temperature lower than about 200° C. to allow the sulfur oxides to be adsorbed on the vanadium oxide-supported activated carbon, contacting the carbon component with a desorbent gas consisting substantially of a member selected from the group consisting of carbon monoxide, hydrogen and a mixture thereof in a concentration at least about 40% relative to the whole volume and the remainder of the desorbent gas being an inert gas, at a temperature between about 230° C. and about 450° C., whereby the adsorbed sulfur oxides are desorbed as sulfur dioxide into the desorbent gas stream, and recovering the desorbed sulfur dioxide from the resulting gas mixture.

2. A process according to claim 1, wherein the ratio of vanadium oxide is from about 0.002 to about 0.03 part by weight in terms of divanadium pentoxide per part by weight of activated carbon.

3. A process according to claim 1, wherein the vanadium oxide is substantially consisting of divanadium pentoxide.

4. A process according to claim 1, wherein the desorbed sulfur dioxide is recovered as liquid sulfur dioxide by cooling the gas mixture to a temperature below about —10° C.

References Cited

UNITED STATES PATENTS

| | | | |
|---|---|---|---|
| 2,734,874 | 2/1956 | Drake | 252—447 X |
| 3,485,581 | 12/1969 | Miller et al. | 23—178 |
| 3,515,679 | 6/1970 | Gaeth et al. | 252—447 X |
| 3,563,704 | 2/1971 | Torrence | 23—178 |

FOREIGN PATENTS 749,940  1/1967  Canada _____ 23—178

OSCAR R. VERTIZ, Primary Examiner

C. B. RODMAN, Assistant Examiner

U.S. Cl. X.R.

23—2 SQ